July 31, 1928.
S. P. MILLER ET AL
1,679,093
POLYMERIZATION AND PURIFICATION OF HYDROCARBONS
Filed Aug. 5, 1926
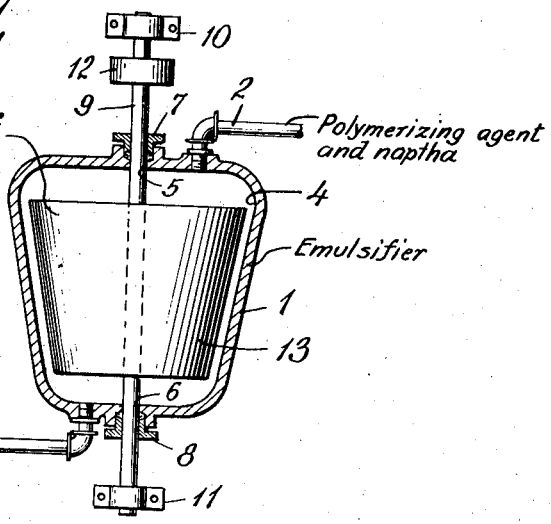
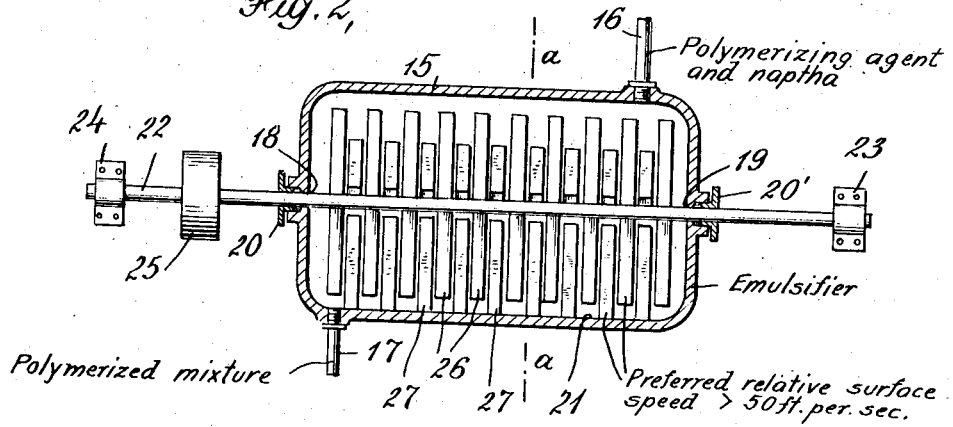
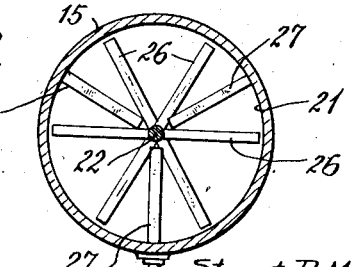
Stuart P. Miller,
Joseph Bennett Hill INVENTORS
BY
Daniel J. Mayne ATTORNEY Patented July 31, 1928.

1,679,093

UNITED STATES PATENT OFFICE.

STUART P. MILLER AND JOSEPH BENNETT HILL, OF PHILADELPHIA, PENNSYLVANIA, ASSIGNORS TO THE BARRETT COMPANY, A CORPORATION OF NEW JERSEY.

POLYMERIZATION AND PURIFICATION OF HYDROCARBONS.

Application filed August 5, 1926. Serial No. 127,226.

Our invention relates to the polymerization of oils and relates more particularly to the polymerization of solvent naphthas and to the purifying of benzol, toluol, xylol and other similar hydrocarbons by the polymerization, or similar conversion, into easily separable compounds, of the impurities in said hydrocarbons. By the use of our process the polymerizable constituents, such as coumarone, indene, etc., in naphtha or the polymerizable impurities in benzol, toluol, xylol, etc., may be substantially continuously polymerized or converted into other compounds in a very rapid and efficient manner.

This application is in part a continuation of our application #676,509, filed November 23, 1923.

Those skilled in the art will recognize that in the purification of these hydrocarbons, in addition to the polymerization, sulfonation of certain of the impurities will occur; certain unsaturated compounds are also converted into tarry bodies. All of these conversion products may, subsequently, be easily removed by washing, distillation and other well known means. When, therefore, reference is hereinafter made to polymerization it is intended to include, besides actual polymerization, such other reactions of the types referred to as ordinarily occur in the purification of the class of hydrocarbons above mentioned.

In our Patent No. 1,464,851 we have shown the advantage of the continuous method of polymerizing by continuously running an oil, such as naphtha and a polymerizing agent, such as sulphuric acid, through a suitable agitator or other vessel. We have found that the quality of the resultant resin is materially improved if the rate of this flow through the polymerizing apparatus is increased. This flow is limited, however, by the speed with which polymerization can be accomplished. This reaction with ordinary agitation, even though very vigorous, takes an appreciable time, say one-half minute, to go to completion.

We have found that advantageous results are obtained and polymerization is more promptly effected if a very intimate contact between the hydrocarbon and the polymerizing agent is produced. This can be done by causing a mixture of the hydrocarbon and sulfuric acid or other polymerizing agent, such as anhydrous aluminum chloride, to pass between two relatively moving surfaces that have a narrow or very restricted space therebetween, one of these surfaces moving rapidly past the other, or the mixture may be emulsified in any other suitable way which will cause thorough and intimate contact of the particles with each other, as for instance by the use of the equipment commonly used for manufacture of emulsions and suspensions.

In order to explain the invention more clearly, devices will be mentioned which may be utilized for bringing about the intimate mixing or contacting, in a continuous manner, of the particles of hydrocarbon and polymerizing agent, although it is to be understood that the emulsification may be effected in other ways than those illustrated.

In the drawings,

Fig. 1 is a vertical section through a device that may be used for carrying out the process;

Fig. 2 is a vertical section through a different form of device; and

Fig. 3 is a section along the line $a$—$a$ of Fig. 2.

We shall describe the operation of the devices hereinafter mentioned, in connection with the polymerization of naphtha although such devices are equally applicable to, and would be operated similarly in, the polymerization or washing of other hydrocarbons such as benzol, toluol, xylol, etc.

In the drawings reference character 1 designates a stationary casing or stator that is provided with an inlet tube 2 and an outlet tube 3. The casing 1 is closed at both ends and its intermediate portion is of the shape of a truncated cone, the inside surface 4 of which is smooth. The casing 1 is provided with holes 5 and 6 having stuffing boxes 7 and 8 therein through which a shaft 9 is adapted to pass. The shaft 9 is mounted in bearings 10 and 11 and may be driven by a motor or pulley 12 or in any other convenient manner and carries a rotor 13 of such a shape that its peripheral surface comes in close proximity to the inner surface 4 of the casing 1 leaving a narrow passage, (exaggerated as to size in the drawings) between the two. This passage is preferably only a few thousandths of an inch wide, for instance five thousandths to fifteen thousandths of an inch, although the width of this path may be made as much as one tenth of an inch or more with fairly satisfactory results. The mixture of naphtha and polymerizing agent is introduced through the inlet 2 and the rotor 13 is driven at a relatively high velocity which may be about 3000 to 15000 feet per minute, more or less, at its periphery. The mixture is thereby either thoroughly emulsified or the particles of one of the components are mixed in an extremely finely subdivided condition in the other one so that the particles of the two respective materials are brought into intimate contact thus causing the polymerization to take place rapidly. The polymerized product is then withdrawn through the pipe 3.

Reference character 15, Figs. 2 and 3, represents a stationary casing or stator that is provided with an inlet pipe 16 and an outlet pipe 17. It has openings 18 and 19 in which there are stuffing boxes 20 and 20' through which the shaft 22 is adapted to pass. The shaft 22 is mounted in bearings 23 and 24 and may be driven by a motor or pulley 25 or in any other convenient manner. The shaft 22 also carries a series of spokes 26 preferably square in cross section. These spokes alternate with pin or projections 27 attached to the inside of the casing 21, which are also preferably square in cross section. In their rotation, the spokes 26 pass very close to the pins or projections 27 leaving spaces therebetween of only a few thousandths of an inch (exaggerated as to size in the drawings). The mixture of naphtha and polymerizing agent is introduced through the inlet pipe 16 and while the shaft 22 is being driven at high velocity the particles of the mixture are intimately contacted so that the polymerization takes place very rapidly and the polymerized product is withdrawn through the pipe 17.

It is to be understood of course, that one or both ends of the stators 1 and 15 are made suitably removable so that the parts to be located in the respective stators may be placed in position therein, the drawings being merely a diagrammatic showing of means for carrying out our process.

The process may also be carried out, for example, by passing a mixture of naphtha and polymerizing agent through the emulsifier illustrated in application Serial No. 678,100, filed December 3, 1923 in which the mixture partakes of a meandering path because of rings on a rotor revolving between corresponding concentric rings mounted on a stator.

As a particular illustration of the sort of naphtha that can be readily treated in this way, it may be mentioned that solvent naphtha containing from about 25% to 50% of polymerizable constituents such as coumarone, indene, etc., may, with about 3% by weight of 66° Bé. sulfuric acid, be introduced into and passed thru a device of the type described for about 10 seconds whereupon polymerization will be effected. The polymerized product may then be permitted to settle and the spent acid drawn off after which the product may be neutralized and distilled in the ordinary and well known ways.

It has been found that resin produced in this way has a better color or is lighter in color than resins produced by processes in which a longer time is required for the polymerization to take place, and that the melting point of the resin produced by this process is increased above that which would be obtained from the same materials in the old processes.

When it is desired to treat such hydrocarbons as benzol, toluol or xylol with a reagent such as sulphuric acid which will convert the impurities in the hydrocarbons into easily separable compounds, the hydrocarbons may be treated in a manner very much similar to the way in which we would polymerize the polymerizable constituents in solvent naphtha.

For instance benzol together with about 8 to 10% of 66° Bé. sulphuric acid may be introduced into the type of device above described. The mixture is permitted to pass thru the device at such a speed that each particle of the mixture remains in the device for about 10 seconds, the relatively moving surfaces being maintained at the speeds mentioned. The impurities in the benzol are thus polymerized or converted and may be easily separated from the mixture by methods well known to those skilled in the art, such as by washing followed by distillation. Toluol, xylol and similar hydrocarbons may be treated in a similar manner, varying the amount of sulfuric acid in the ordinary way.

In the claims appended hereto, "a hydrocarbon" includes the above mentioned hydrocarbons and reasonable equivalents thereof and "impurities" includes the coumarone, indene, etc., in naphtha as well as the recognized impurities such as the unsaturated and easily sulfonatable materials ordinarily removed from the hydrocarbon by the usual purification methods. "Polymerizing agent" or "reagent" is intended to include such materials as sulfuric acid of varying strengths, anhydrous aluminum chloride and other materials recognized by those skilled in the art as valuable for purification of hydrocarbons. "Emulsifying", "emulsifier" or "minute subdivision of one in the other" is intended to be that step, apparatus or condition, respectively, whereby a substantially microscopic subdivision of the reacting materials obtains.

We claim:

1. The process which comprises emulsifying a polymerizing agent and naphtha containing polymerizable constituents.

2. The process which comprises emulsifying a liquid polymerizing agent and naphtha containing polymerizable constituents.

3. The process which comprises emulsifying sulfuric acid and naphtha containing polymerizable constituents.

4. The process which comprises agitating a polymerizing agent and naphtha containing polymerizable constituents sufficiently to form a minute subdivision of one in the other.

5. The process which comprises agitating sulfuric acid and naphtha containing polymerizable constituents sufficiently to form a minute subdivision of one in the other.

6. The process which comprises treating a mixture of a polymerizing agent and naphtha containing polymerizable constituents by passing the same between surfaces spaced apart from 0.005 to 0.10 of an inch and moving relative to each other at a velocity sufficient to emulsify said polymerizing agent and naphtha.

7. The process which comprises treating a mixture of sulfuric acid and naphtha containing polymerizable constituents by passing the same between surfaces spaced apart from 0.005 to 0.10 of an inch and moving relative to each other at a velocity sufficient to emulsify said acid and naphtha.

8. The process which comprises treating a mixture of a polymerizing agent and naphtha containing polymerizable constituents by passing the same between surfaces moving relative to each other at a velocity above 50 feet per second, said surfaces being so spaced as to cause emulsification of said polymerizing agent and naphtha when passed therebetween.

9. The process which comprises treating a mixture of a polymerizing agent and naphtha containing polymerizable constituents by passing the same between surfaces moving relative to each other at a velocity above 50 feet per second and spaced apart from 0.005 to 0.10 of an inch.

10. The process which comprises mixing about 3% by weight of approximately 66° Bé. sulfuric acid with naphtha containing polymerizable constituents and finely dividing one in the other.

11. The process which comprises mixing about 3% by weight of approximately 66° Bé. sulfuric acid with naphtha containing polymerizable constituents and emulsifying, neutralizing and distilling the same.

12. The process of polymerizing naphtha which comprises passing naphtha and a polymerizing agent substantially continuously through an emulsifier.

13. The process of polymerizing naphtha which comprises passing naphtha and sulfuric acid substantially continuously through an emulsifier.

14. The process which comprises treating a mixture of a polymerizing agent and naphtha containing polymerizable constituents by passing the same between surfaces spaced apart from 0.005 to 0.015 of an inch and moving relative to each other at a velocity sufficient to emulsify said polymerizing agent and naphtha.

15. The process of polymerizing oils which comprises passing the oil and a polymerizing agent substantially continuously thru an emulsifier.

16. The process which comprises emulsifying a hydrocarbon containing impurities and a liquid reagent that will react upon the impurities without appreciable reaction upon said hydrocarbon.

17. The process which comprises introducing into a receptacle, a hydrocarbon containing impurities and a liquid reagent that will react upon the impurities without appreciable reaction upon said hydrocarbon and mixing said materials sufficiently to form a minute sub-division of one in the other.

In testimony whereof we affix our signatures.

STUART P. MILLER.
JOSEPH BENNETT HILL.